(12) United States Patent
Duvillard et al.

(10) Patent No.: US 7,474,137 B2
(45) Date of Patent: Jan. 6, 2009

(54) INTEGRATED CIRCUIT CLOCK DISTRIBUTION

(75) Inventors: Sylvain Duvillard, Cannes (FR); Isabelle Delbaere, Cagnes sur Mer (FR)

(73) Assignee: NXP B.V., Eindhoven (NL)

( * ) Notice: Subject to any disclaimer, the term of this patent is extended or adjusted under 35 U.S.C. 154(b) by 72 days.

(21) Appl. No.: 10/596,455

(22) PCT Filed: Dec. 6, 2004

(86) PCT No.: PCT/IB2004/004026

§ 371 (c)(1),
(2), (4) Date: Jun. 14, 2006

(87) PCT Pub. No.: WO2005/064434

PCT Pub. Date: Jul. 14, 2005

(65) Prior Publication Data

US 2007/0194829 A1     Aug. 23, 2007

(30) Foreign Application Priority Data

Dec. 19, 2003     (EP) .................................. 03300273

(51) Int. Cl.
*G06F 1/04* (2006.01)

(52) U.S. Cl. ...................................... 327/293; 327/295

(58) Field of Classification Search ................. 327/291, 327/293, 295–297, 231, 261, 285
See application file for complete search history.

(56) References Cited

U.S. PATENT DOCUMENTS

| | | | | |
|---|---|---|---|---|
| 5,430,397 A * | 7/1995 | Itoh et al. | ..................... | 326/101 |
| 5,481,573 A * | 1/1996 | Jacobowitz et al. | ......... | 375/356 |
| 5,963,075 A * | 10/1999 | Hiiragizawa | ................ | 327/295 |
| 5,982,238 A * | 11/1999 | Soderquist | ..................... | 331/2 |
| 6,125,157 A * | 9/2000 | Donnelly et al. | ............ | 375/371 |
| 6,157,237 A * | 12/2000 | Mitra | ......................... | 327/295 |
| 6,525,587 B2 * | 2/2003 | Makino | ...................... | 327/292 |
| 6,538,957 B2 * | 3/2003 | Magoshi | ..................... | 365/233 |
| 6,686,785 B2 * | 2/2004 | Liu et al. | ..................... | 327/158 |
| 6,711,724 B2 * | 3/2004 | Yoshikawa | ..................... | 716/6 |

* cited by examiner

*Primary Examiner*—Lincoln Donovan
*Assistant Examiner*—Hai L. Nguyen
(74) *Attorney, Agent, or Firm*—Peter Zawilski

(57) ABSTRACT

A circuit is provided with a plurality of interconnected logic blocks, a main clock generator for distributing a reference clock signal to the logic blocks. Each logic block in the circuit comprises a local clock generator that generates a set of synchronized local clock signals from the reference clock signal for further provision to respective elements of the logic block. In such a circuit, a phase shift is introduced between a set of local clock signals of a first block and a set of local clock signals of a second block.

10 Claims, 5 Drawing Sheets

INTEGRATED CIRCUIT CLOCK DISTRIBUTION

The present invention relates to semiconductor circuits and clock distribution to different areas of an integrated circuit. The invention is also concerned with clocking strategies to optimize a clock equilibrium among blocks for which inter-blocks synchronization is necessary.

In large-scale integrated circuits (ICs), the tendency is to an increase in the chip area and the clock frequency. ICs are built with elements like flip-flop cells whose operations and switching keep getting faster and the number of points to be balanced increases exponentially with the size of the chip. A consequence of these two trends is a worsening of the clock skew and the industry strives to maintain the quality of the overall clock tree of new circuit designs to an acceptable level. Solutions have thus been contemplated to shorten clock skews however designers need to pay special attention to the power consumption which may tend to go up with some of the developed techniques.

US2002/0060595 discloses a method for decreasing clock skews of large-scale integrated circuits. This document proposes a semiconductor IC which includes a plurality of areas which operate with independent clocks and a phase separation element which differentiates the phase of one of the clocks from the phases of the other clocks and distributes the clocks to the areas, respectively. In the disclosed circuit, a phase separation element distributes a clock to a clock driver of each area. The phase separation element has an element which sets and distributes the phase of each clock so that start points of each cycle of the clocks to be distributed to the areas, respectively, are at different timings for each of the areas. In this solution, the distribution of the clock to a given area still relies on the distribution paths from the phase separation element and these paths from the main clock generator or phase separation element to areas to be supplied may be become large as the number of points in circuits increases. The depth of the overall clock tree of the circuit may become large and distribution paths thus become unreliable and subject to external noise issues.

The inventors have sought a solution for clock distribution to logic blocks that alleviates the flaws of existing designs.

A circuit is proposed that includes a plurality of interconnected logic blocks. A reference clock generator generates a reference clock signal that is distributed to all logic blocks. Each block includes at least one local clock generator generating a respective set of synchronized local clock signals. The generator produces the local clock signals from the reference clock signal and further provides them to respective elements of the logic block. The circuit is such that a set of local clock signals of a first block is phase shifted relative to a set of local clock signals of another block.

The invention introduces clock generators in each block so that clock generation can be managed locally compared to a design where generation and distribution of clocks within blocks is centrally managed. Managing clocks locally permits to reduce the scale of the circuit to the block level and thus avoids problems with clock equilibration and clock skews of large chip designs. Allowing local clocks to be independent from one block to another permits to reduce the clock skews and the over-all quality of the clock tree is thus increased. The phase shift introduced between some logic blocks of the circuit prevents all local clocks from switching simultaneously which is known to cause power drain. Indeed, if all local clocks in the circuit were phase-synchronous and synchronized with the reference clock, one may observe, at the level of the reference clock, peaks of drain of power around clock edges. Such phenomenom requires strong on-chip power supply which is often associated with yield loss. The phase shift introduced in the invention thus smoothes these power peaks. Another advantage of one or more embodiments of the invention is to reduce the number of circuit points that need to be balanced.

These and other aspects of the invention will be apparent from and will be elucidated with reference to the embodiments described hereinafter. The present invention will now be described in more detail, by way of example, with reference to the accompanying drawings, wherein.

Figure 3:
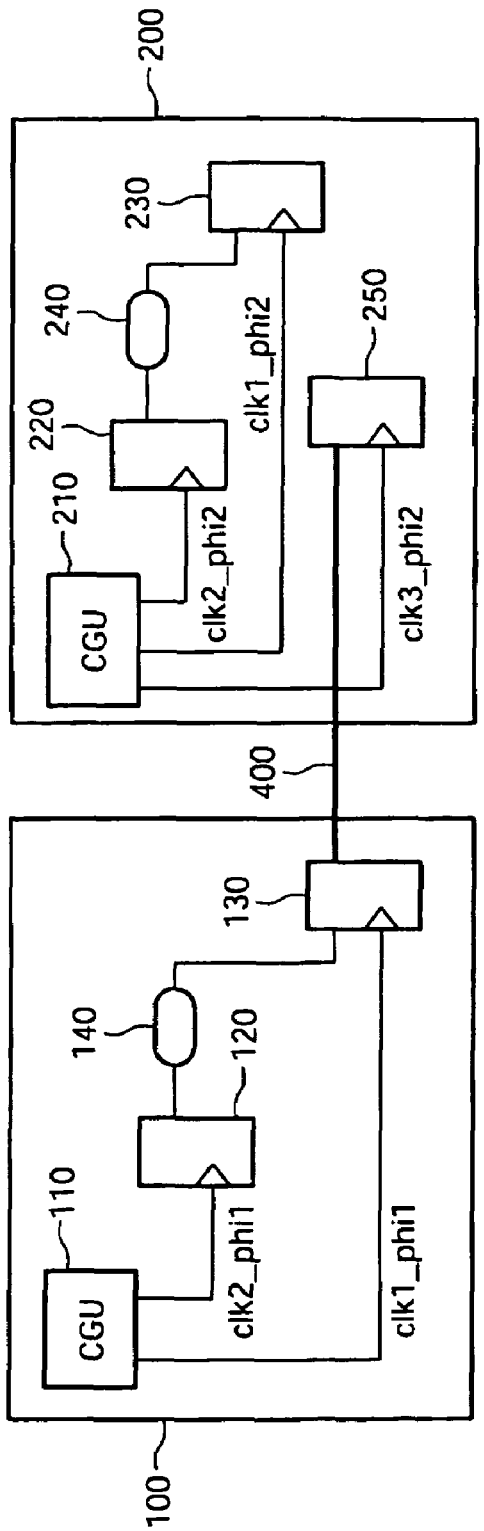
FIG. 3 is a block diagram of another exemplary embodiment of logic blocks in a circuit of the invention.
Figure 6:
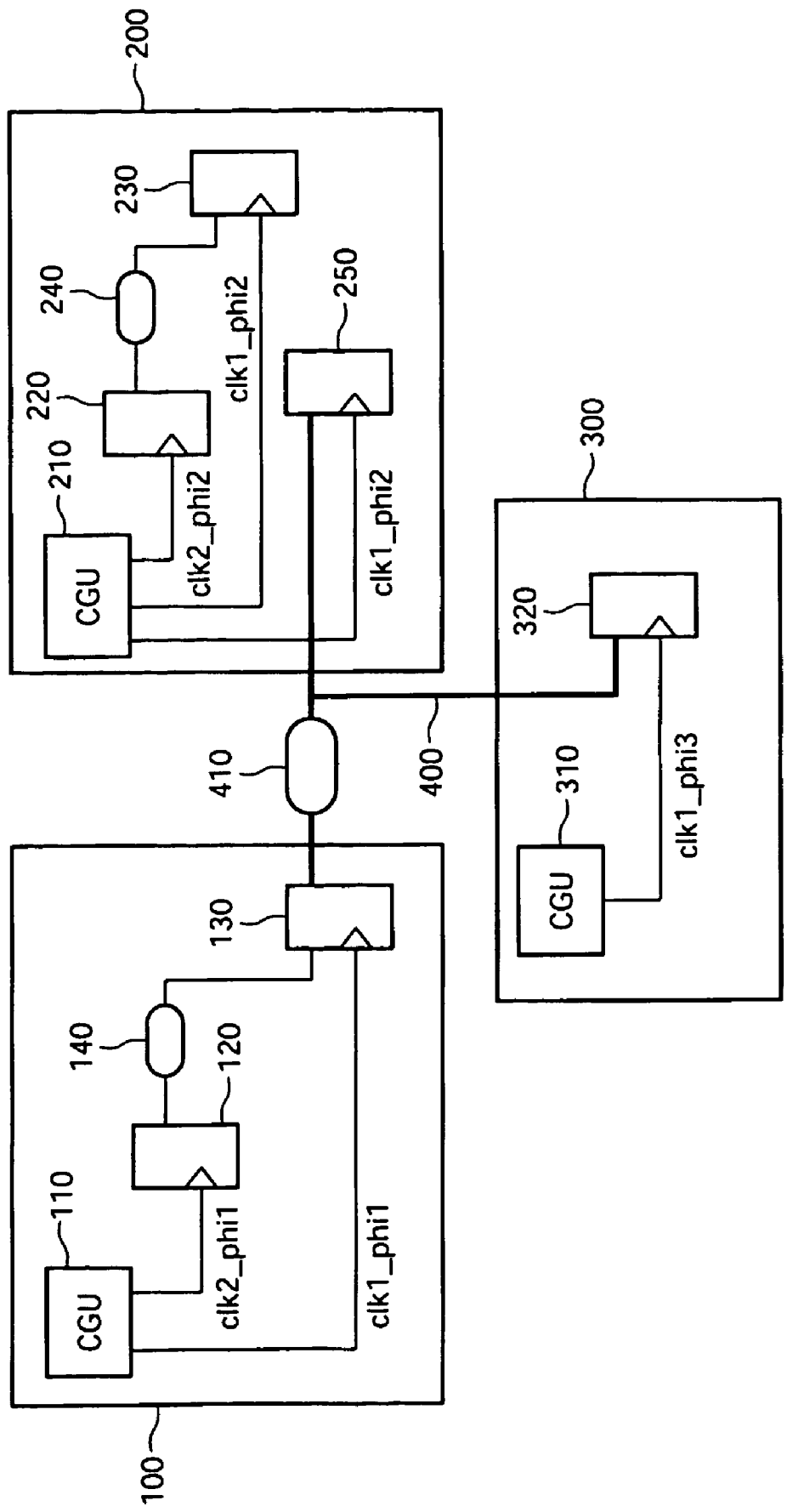
Figure 7:
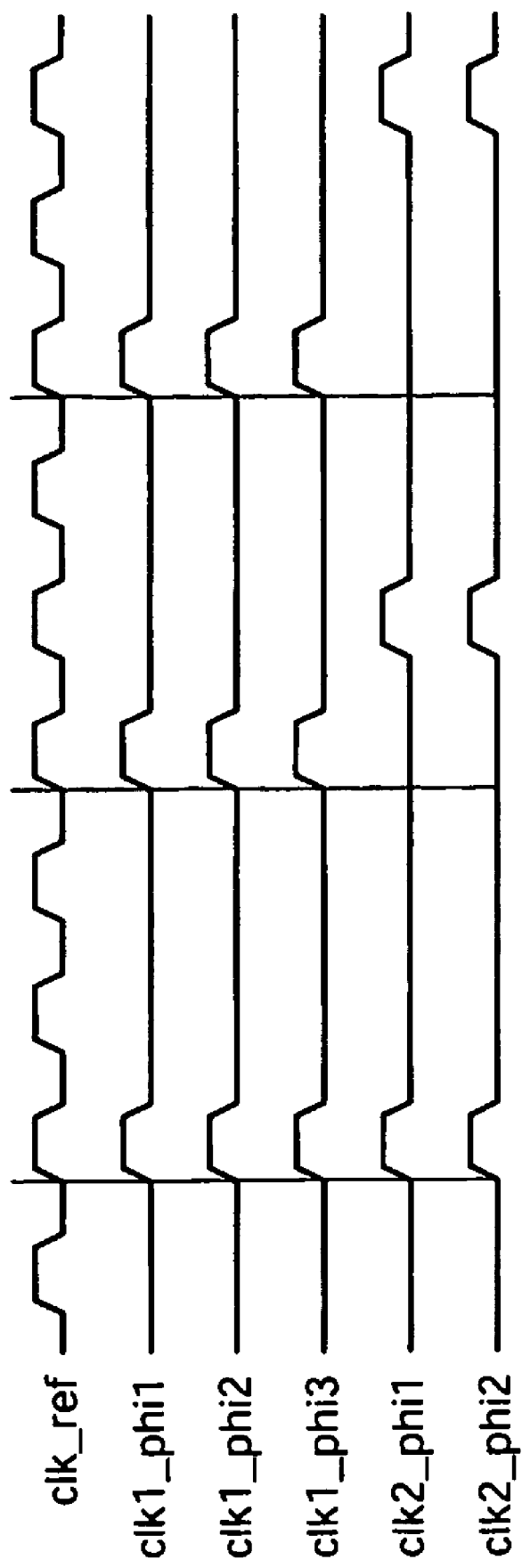

The invention will be illustrated by means of several exemplary embodiments of blocks of a circuit of the invention. A circuit of the invention may include one or more types of pairs or groups of blocks such as the ones presented here or a combination of the like. However the blocks' designs presented here, the elements contained therein and the data paths between blocks as shown in FIG. 3 and FIG. 6 are only given for illustrated purposes and should not be used to limit the scope of the invention and the design of a circuit of the invention. In the following description, clocks generated in blocks 100, 200 and 300 are respectively referenced by suffixes phi1, phi2 and phi3.

Figure 1:
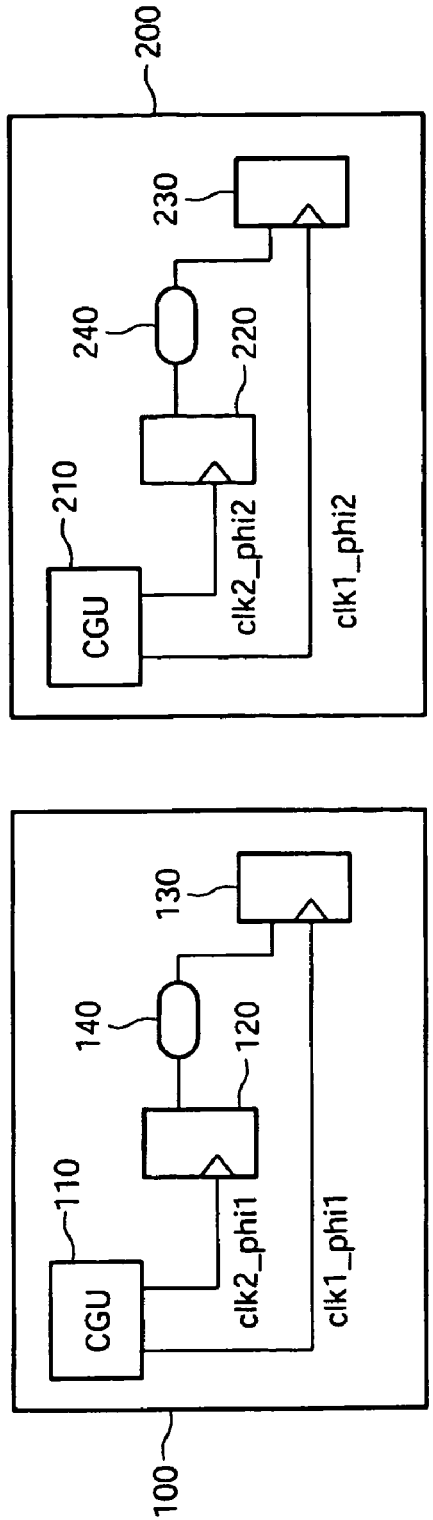
FIG. 1 is a block diagram of an exemplary embodiment of logic blocks in a circuit of the invention.

FIG. 1 is a first block diagram of an exemplary embodiment of a portion of a circuit of the invention comprising logic blocks 100 and 200. The circuit of the invention may be any type of Integrated Circuit such as an RF circuit or a processing circuit. In this embodiment, block 100 includes, for example, clock generator unit 110, flip-flop cells 120 and 130 and combinatorial cells 140 between data output of cell 120 and data input of cell 130. Clock generator unit 110 produces local clock signals clk1_phi1 and clk2_phi1 from a reference clock Clk_ref received from a reference clock generator of a circuit of the invention, e.g. internal clock signals clk1_phi1 and clk2_phi1 may be obtained from clock division and phase shifting of the received reference clock clk_ref. Clocks clk1_phi1 and clk2_phi1 are synchronized with reference clock clk_ref. The reference clock generator of circuit is not shown in FIG. 1 and may be implemented as the instantiation of a Phase Locked-loop block. Block 200 is similar to block 100 and comprises similar elements: local clock generator unit 210 produced local clock signals clk2_phi2 and clk1_phi2 supplied to respective enable inputs of flip-flop cells 220 and 230 via memory 240.

In this first embodiment, blocks 100 and 200 operate independently from each other and no data exchange takes place between the two blocks. There is therefore no need to synchronize both blocks. On the contrary, in this embodiment, a phase-shift is arbitrarily introduced between the set of clocks generated in block 100, i.e. clk1_phi1 and clk2_phi1 and the set of clocks generated in block 200, i.e. clk1_phi2 and clk2_phi2. Respective local clocks of blocks 100 and 200 are shown in timing diagram of FIG. 2 and as can be seen, a phase-shift of one clock cycle of the reference clock clk_ref is introduced by clock generator units 110 and 210. In addition, a clock tree may be built for each independent block 100 and 200 and each block is independently balanced to ensure no margin between clock edges of the internal clock signals. A result of this is that all local clock signals of each respective block are synchronized for synchronous internal operations of the elements in a given block.

Figure 2:
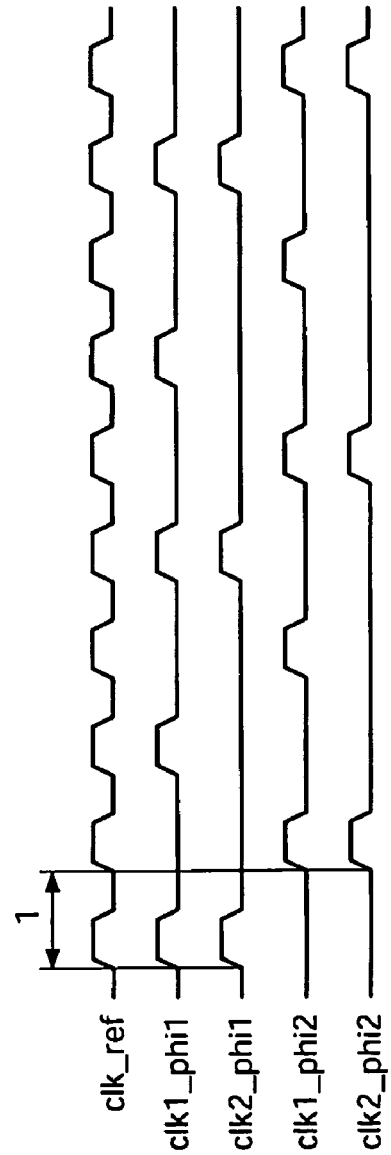
FIG. 2 is a timing diagram showing local clocks of logic blocks of FIG. 1.
Figure 4:
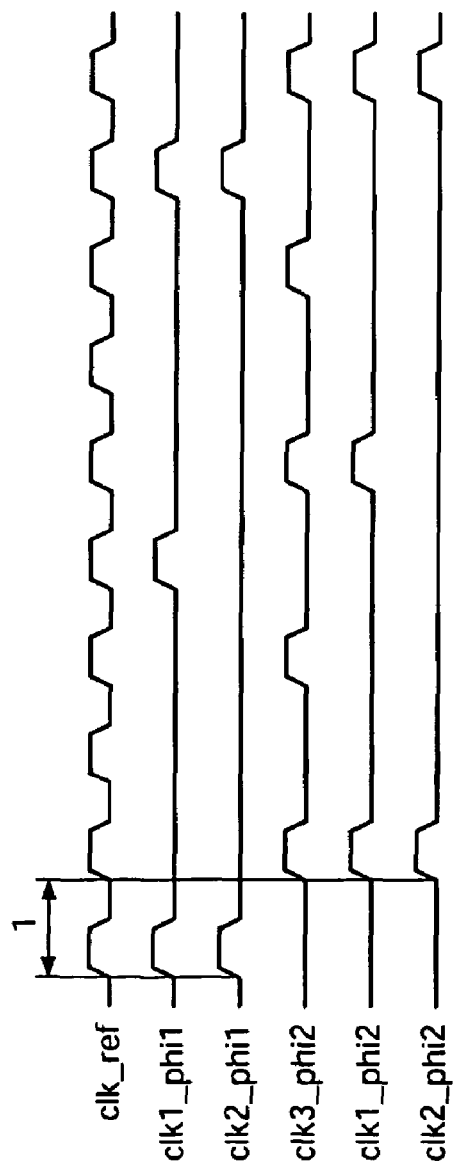
FIG. 4 is a timing diagram of local clocks of logic blocks of FIG. 3.

FIG. 2 is another exemplary embodiment of a portion of a circuit of the invention. Blocks 100 and 200 in this embodiment communicate via data path 400. Data path 400 may be a one-way single data path. Data output of cell 130 is connected to data input of flip-flop cell 250 of block 200. Enable input of cell 250 is triggered by clock clk3_phi2 generated by clock generator unit 210. As shown in FIG. 4, each block 100 and 200 is internally balanced and internal clocks of block 100, i.e. clock signals clk1_phi1 and clk2_phi1 are thus synchronized with each other and further synchronized with reference clock clk_ref from which they are derived. In a similar fashion, in block 200, clocks signals clk1_phi2, clk2_phi2 and clk3_phi 2 are also synchronized with each other and with the reference clock clk_ref from which they are also derived. In this embodiment, a phase shift of one reference clock cycle is also introduced between the set of internal clocks of block 100 and the set of internal clocks of block 200. Indeed, data is transmitted from cell 130 of block 100 to cell 250 of block 200 via data path 400. Data is applied onto data path 400 when enable input of cell 130 is activated, i.e. when clock signal clk1_phi of block 100 supplied to enable input of cell 130 toggles. Data is taken by cell 250 from data path 400 when enable input of cell 250 is activated, i.e. when clock signal clk3_phi2 of block 200 supplied to enable input of cell 250 toggles. In this exemplary embodiment, clock signal clk3_phi2 toggles one clock cycle later than internal clock clk1_phi1 of block 1 and current data is therefore present at data input of cell 250 when cell 250 is activated.

Figure 5:
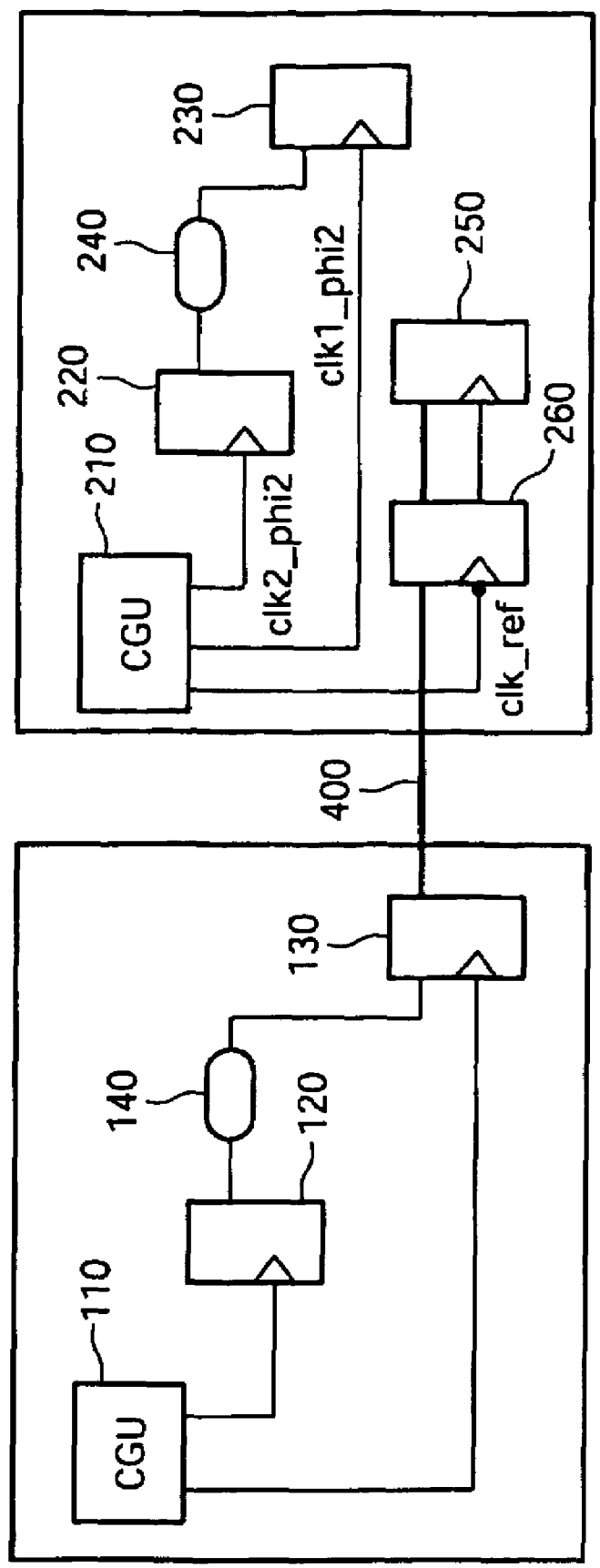
FIG. 5 and FIG. 6 are block diagrams of other exemplary embodiments of logic blocks in a circuit of the invention; and, FIG. 7 is a timing diagram of local clocks of logic blocks of FIG. 6.

In a fourth exemplary embodiment depicted in FIG. 5, switching of cell 250 is controlled by reference clock clk_ref provided at the enable input of cell 250. However, because block 100 is internally balanced, the following two signals are synchronized with each other:

clock signal clk1_phi which causes the activation of cell 130 and as a consequence the writing of data onto data path 400, and, reference clock signal clk_ref.

In addition, cell 250 reads data path 400 when reference clock signal clk_ref toggles. A data violation may then occur when cell 250 reads data from data path 400 which is not yet present and stable because it is simultaneously outputted by cell 130. To this end, flip-flop cell 260 with an inverted enable input is placed onto data path 400 between cell 130 and cell 250 to permit reading of data on path 400 at the time of the down switching of the reference clock signal clk_ref. Data provided by cell 130 is therefore stable on data path 400 when cell 260 reads data conveyed on data path 400. Data may then be provided to cell 250 when reference clock clk_ref toggles up.

FIG. 6 proposes another embodiment of a portion of a circuit of the invention that includes blocks 100, 200 and 300. In this particular exemplary embodiment of blocks 100, 200 and 300, a data bus 400 interconnects output of block 100 to input of blocks 200 and 300. Contrary to the embodiments presented in reference to FIG. 3 and FIG. 5 where data path 400 is a one-way data link, data bus 400 dues to its nature poses an additional constraint on the designs of blocks 100, 200 and 300. Indeed, data bus 400 may be a bidirectional communication bus and requires that data is written and read in a synchronous manner. Thus, blocks 100, 200 and 300 need to be balanced with each other on top of their internal clock equilibrium. Clock generators 110, 210 and 310 are thus first set up to generate synchronized set of internal clocks within blocks 100, 200 and 300, i.e. the blocks are internally balanced. Then, a clock tree for the three blocks taken together is also equilibrated and all internal clocks are synchronized.

The invention claimed is:

1. A circuit comprising:
a plurality of interconnected logic blocks;
a main clock generator for distributing a reference clock signal to the logic blocks;
at least one local clock generator in each logic block for generating a respective set of synchronized local clock signals from the reference clock signal for further provision to respective elements of the logic block;
wherein a set of local clock signals of a first block is phase shifted relative to a set of local clock signals of a second block.

2. The circuit of claim 1, wherein the first and second blocks communicate via a one-way data path.

3. The circuit of claim 2, wherein the first block comprises a first logic cell configured to write data onto the one-way data path on a rising edge of one of the local clock signals of the first block provided at an enable input of the first logic cell and the second block comprises a second logic cell configured to read the written data from the one-way data path on a rising edge of one of the local clock signals of the second block provided at an enable input of the second logic cell.

4. The circuit of claim 2, wherein the first block comprises a first logic cell configured to write data onto the one-way data path on a rising edge of one of the local clock signals of the first block provided at an enable input of the first logic cell and the second block comprises a second logic cell configured to read the written data from the one-way data path on a falling edge of the reference clock signal provided at an enable input of the second logic cell.

5. The circuit of claim 3, wherein the first and second logic cells are flip-flop cells.

6. The circuit of claim 1, wherein the phase shift of the set of lock clock signals of the first block relative to the set of local clock signals of the second block reduces peak power consumption of the circuit.

7. The circuit of claim 1, further comprising at least two additional blocks that communication via a two-way data bus and wherein respective sets of local clock signals of the at least two additional logic blocks are synchronized with each other.

8. The circuit of claim 1, wherein the first block includes first and second flip-flop cells that are enabled by respective clock signals of the set of local clock signals of the first block and that each have a data input and a data output, the first block further including combinatorial cells that couple the data output of the first flip-flop cell to the data input of the second flip-flop cell.

9. The circuit of claim 8, wherein the second block includes third, fourth and fifth flip-flop cells that are enabled by respective clock signals of the set of local clock signals of the second block and that each have a data input and a data output, the second block further including combinatorial cells that couple the data output of the third flip-flop cell to the data input of the fourth flip-flop cell, and wherein the data output of the second flip-flop cell is coupled to the data-input of the fifth flip-flop cell via a one-way data path.

10. The circuit of claim 9, wherein the second block further includes a sixth flip-flop cell that is located on the one-way data path between the second and fifth flip-flop cells and that has a data input and a data output, the data input of the sixth flip-flop cell being coupled to the data output of the second flip-flop cell and the data output of the sixth flip-flop cell being coupled to the data-input of the fifth flip-flop cell.

* * * * *